Aug. 18, 1936.  J. W. CONNORS  2,051,794
AUTOMATIC TRANSMISSION GEARING
Filed Jan. 26, 1935  3 Sheets-Sheet 1

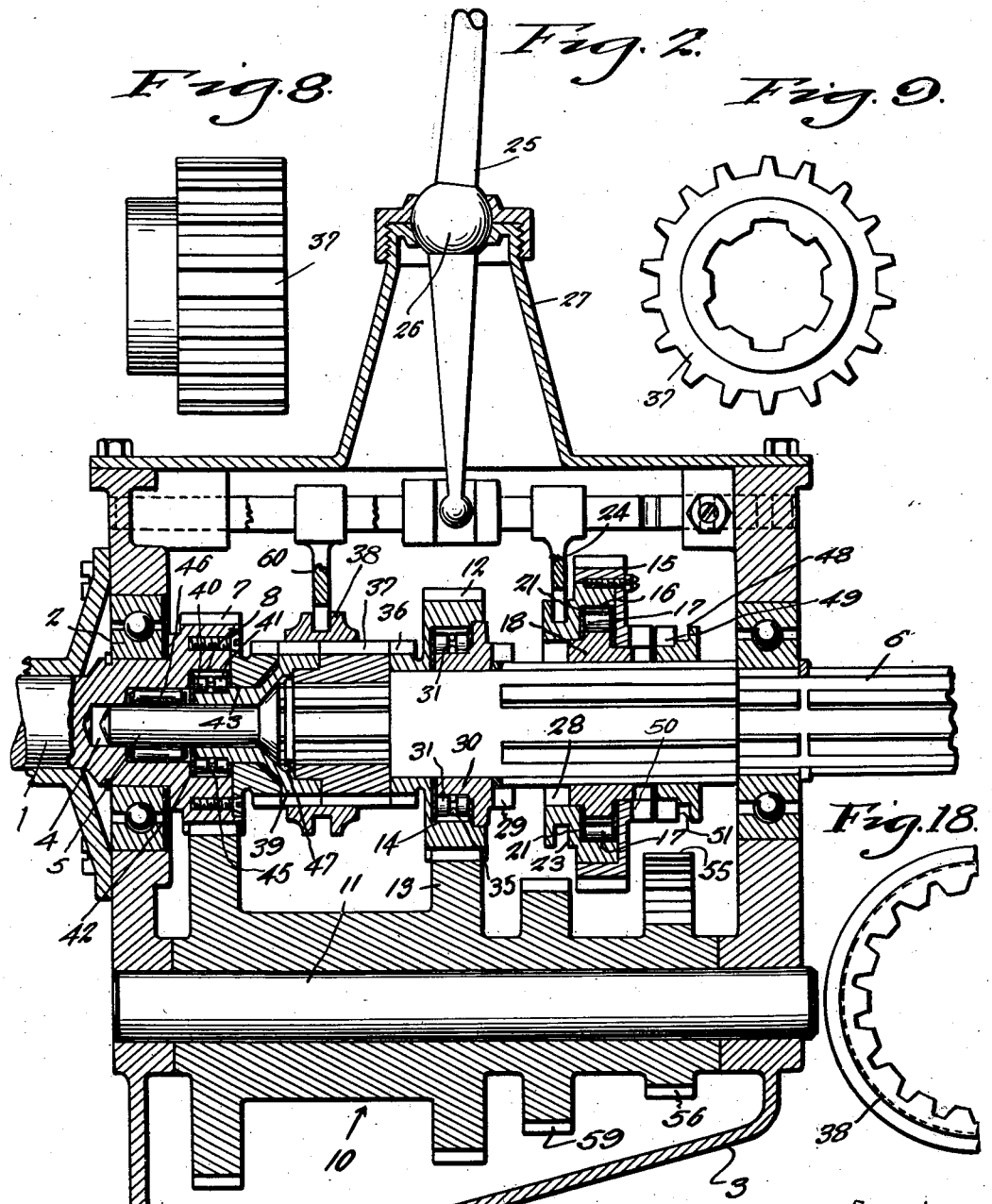

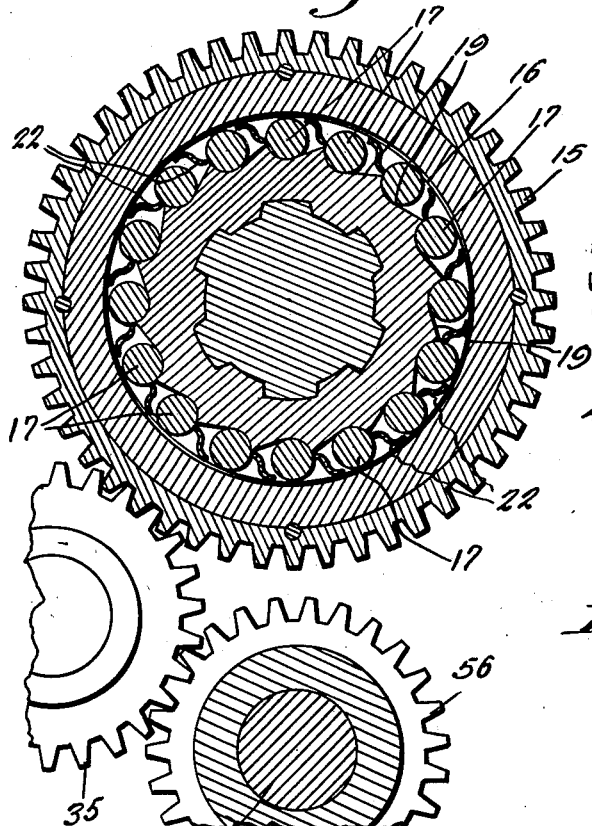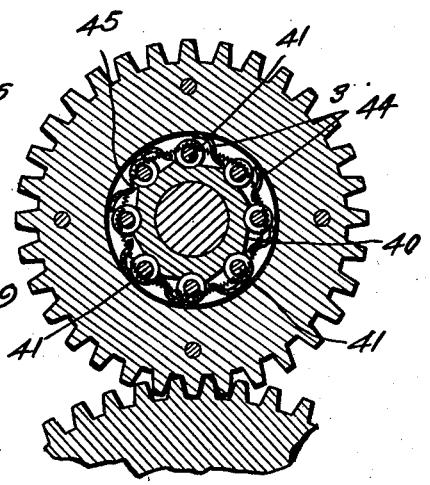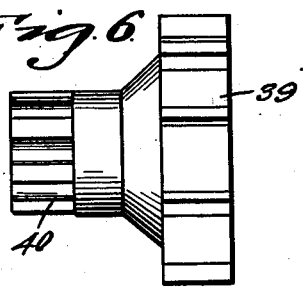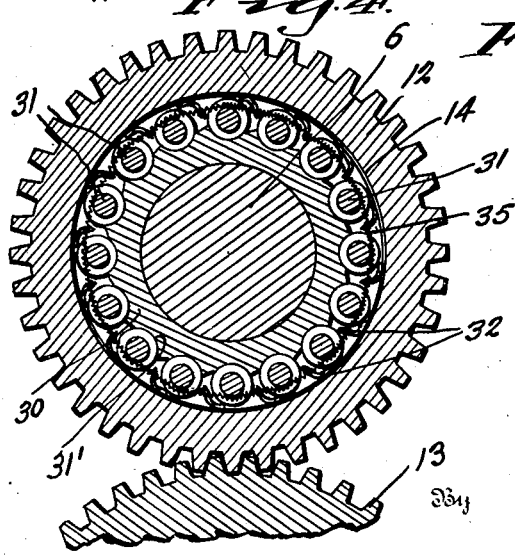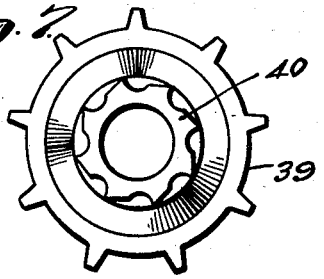

Patented Aug. 18, 1936

2,051,794

UNITED STATES PATENT OFFICE 2,051,794

AUTOMATIC TRANSMISSION GEARING

John W. Connors, Washington, D. C.

Application January 26, 1935, Serial No. 3,668

6 Claims. (Cl. 74—336)

This invention relates to a transmission gearing for automotive vehicles and is an improvement on the transmission disclosed in my Patent 1,944,069.

I have found that the gearing of my said patent generates an undesirable amount of heat of friction during operation and furthermore, that a certain amount of gear clashing results from the structure shown and it is an object of this invention to overcome these defects.

Other and further important objects will become apparent as the description proceeds while others will be more particularly pointed out. In the specification and the annexed drawings, the invention is illustrated in what I now consider the preferred embodiment, but it is to be understood that the invention is not limited to the particular form shown, because it may be embodied in other forms and it is also to be understood that in and by the claims following the description, it is my desire to cover the invention in whatever form it may be embodied.

In the drawings,

Fig. 1 is a top plan view of my transmission gearing showing the various parts in neutral position;

Fig. 2 is a view partly in section on line 2—2 of Fig. 1;

Fig. 3 is a sectional view taken on line 3—3 of Fig. 1;

Fig. 4 is a sectional view taken on line 4—4 of Fig. 1;

Fig. 5 is a sectional view taken on line 5—5 of Fig. 1;

Fig. 6 is a plan view of a bell clutch forming a part of the high speed unit;

Fig. 7 is an end elevation of Fig. 6;

Fig. 8 is a plan view of another member of the high speed unit;

Fig. 9 is an end elevation of Fig. 8;

Fig. 10 is a detail of the clutching rollers used in the intermediate and high speed units;

Fig. 11 shows a detail of the cam sleeve provided in the intermediate speed unit;

Figs. 12 and 13 show details of the clutching roller cage;

Figs. 14 and 15 are detail views of the low speed cam sleeve members;

Fig. 16 is a fragmentary detail of the reversing sleeve; and

Fig. 17 is a detail showing the action of the clutching members of intermediate and high speed units.

Fig. 18 is a fragmentary view of the manual shifting collar between the secondary and high speed units.

Referring more particularly to the drawings, 1 represents the drive or clutch shaft journaled as is usual in bearings 2 formed in the forward end of the usual transmission housing 3, and provided with a bearing 4 receiving the reduced forward end 5 of the pilot or main transmission shaft 6. The clutch shaft 1 carries a pinion or gear 7 which, in this instance, is recessed at its inner end as shown at 8 for a purpose to be hereinafter described. This gear 7 meshes constantly with the tertiary driving gear 9 of the gear cluster, generally indicated at 10 and which is secured on the jack or countershaft 11, also journaled in bearings formed in the transmission housing and generally below the pilot shaft.

Loosely mounted upon the pilot shaft 6 is the secondary driven gear 12 which meshes constantly with the secondary driving gear 13 and is also provided with a recess 14, the purpose of which will be hereinafter described. The primary gear is illustrated at 15 and this gear too is provided with a recess 16 to receive clutch elements 17.

Splined to shaft 6 for sliding movement is a cam sleeve driving member 18 which is more particularly shown in Figs. 3, 14 and 15. This member is provided with a plurality of crescent-shaped recesses 19 equally spaced about its periphery. Recesses 19 are adapted to receive rollers 17 and these recesses are of sufficient depth at their lowest point to hold the rollers 17 without contacting the inner face of gear 15. Maintaining rollers 17 in perfect alignment are two discs 21 which are mounted on member 18 for free rotation. Joining discs 21 are a plurality of equally spaced spacer members 22 one of which lies between each two rollers. These members are arranged at a peculiar incline with respect to rollers 17 and are positioned below the axis of these rollers for a purpose which will hereinafter appear. The discs 21 lie in frictional contact with the walls of the recess in the gear 15 so that upon initial rotation of the gear, the discs rotate with the gear and the transverse spacer members 22 move the rollers 17 into clutching or wedging position between the sleeve 18 and the gear 15 to drive the sleeve.

Formed as a part of gear 15 is a collar 23 which receives a shifter fork 24 which is actuated through a gear shift lever 25 which is mounted for universal movement on a ball 26 seated in the top of the transmission cover casing 27. The manual shifting lever is of the usual form and therefore requires no further description.

Member 18 of the primary gear unit has formed therewith teeth 28 which are adapted to mesh with teeth 29 formed on the peripheral surface of cam sleeve clutch member 30 positioned within the recess 14 of gear 12 and mounted for free rotation on the transmission shaft 6.

The cam sleeve clutch member 30 has a cammed peripheral surface similar to the sleeve 18 of the primary gear unit with the exception, however, that the trough of the cam surface is more abruptly formed as shown in Fig. 17 at 31' for the purpose of at least momentarily restraining the rollers 31 from upward movement upon rotation of this member. Rollers 31 are spaced about the cam sleeve 30 and held in spaced relation by members 32 supported by floating retainer rings 33 and 33', which are in frictional contact with the respective sleeves and gears and the whole being of a construction similar to the clutch member of the primary gear unit. Rollers 31 of the secondary gear unit are recessed at 34, as more particularly shown in Fig. 10, for the purpose of receiving a tension spring 35. Formed as a part of gear 12 is a smaller coaxial clutch member 36 extending from the rear side thereof and this clutch member is adapted to be joined to shaft keyed clutch 37 by means of a manually shiftable collar 38. The shiftable collar 38 is likewise adapted to join clutch 37 to bell clutch 39 which forms a part of the high speed unit or during manual operation the collar 38 may join clutches 37, 39, and the clutch teeth of the clutch 7 which are in alignment therewith. Bell clutch 39 is likewise formed with clutch cam surfaces 40 at its small end which are adapted to hold clutching rollers 41 retained in position by floating rings 42 and 43 which are in frictional contact with their respective clutch and gear and circumferentially spaced by spacing members 44 as more particularly shown in Fig. 5. Rollers 41 of the high speed unit are likewise held under tension by a spring 45, the construction and operation of which is similar to that of the intermediate speed unit.

The bell clutch 39 is carried for free rotation on the reduced end 5 of shaft 6, which shaft is supported by roller bearings 46 in the recessed portion of shaft 1. A locking ring 47 between the clutch 37 and a shoulder on the shaft 6 assists in retaining the clutch 37 in position.

Splined to shaft 6 is a clutch sleeve 48 which has teeth 49 on its inner edge adapted to mesh with teeth 50 on member 15. The other edge of sleeve 48 is formed with a recess 51 adapted to receive a forked member 52, which member is mounted for sliding movement in a bearing 53. Sleeve 48 is provided for the purpose of reversing the gear movement and the same is adapted to spline gear 15 to shaft 6 for reverse drive when the gear 15 is carried in engagement with intermediate stub gear 55. In order to more accurately control the movement of sleeve 48, forked member 52 is pressed by a spring 57 which engages one end of the sliding rod 58 and which at its other end abuts a part of the casing 3. Thus, the clutch sleeve 48, when not in active use is held at a point intermediate the end of housing 3 and primary gear unit 15 for a purpose which will hereinafter be disclosed.

As shown in Fig. 2 of the drawings, the transmission is in a neutral position. Upon initial operation of the motor, shaft 1 is driven and power is transmitted through the shaft 1, gear 7 to gear 9 of the tertiary cluster. Each of gears 9, 13, 56 and 59 of the tertiary unit is now driven in a counterclockwise direction. By operating the shifting rod 25 to move the primary gear 15 into engagement with the gear 59, the shaft 6 is driven in the following manner: gear 15, being normally free to rotate with respect to floating retaining rings 21 and the cam sleeve 18, will have a tendency to rotate the retaining rings upon its initial movement because of the natural adhesive characteristic of the surrounding lubricant which has a tendency to resist the initial relative movement between the gear and the rings. Upon rotation of the rings 21, the transverse spacers 22 will carry the rollers 17 up the incline of the cam surface of the sleeve 18 and when these rollers have been carried substantially to the apex of the cam members in the sleeve 18, sleeve 18 and gear 15 will be firmly clutched together and will rotate as a unit, thus driving shaft 6 in a clockwise direction. At the same time, teeth 28 and 29 of clutch sleeves 18 and 30 respectively have been pressed into engagement so that the clutch sleeve 30 is driven from the sleeve 18 and when sleeve 30 reaches a predetermined speed, determined by the tension of spring 35 and the depth of groove 31', rollers 31 will move outwardly under the influence of centrifugal force and engage the inner surface of the gear 12 so that the same will be bound between the cam surface of sleeve 30 and gear 12, thus binding gear 12 to shaft 6 for driving relation through gear 13 of the tertiary unit. Upon the increased speed of rotation of shaft 6, gear 15 and its associated cam sleeve 18 will be disconnected by virtue of the differential rotative speed, and the drive will now be through the intermediate gear.

Without further manipulation of the gear shift lever 25, the transmission will automatically flow into high speed, for collar 38 joins clutch 37 and bell clutch 39 for rotation. Thus, it is obvious that the rotation of shaft 6 is transmitted to bell clutch 39 and when the rotary speed reaches a point sufficient to move rollers 41 outwardly by centrifugal force and into engagement with the inner face of the clutch 7, the bell clutch 39 and the gear 7 will be clutched together for direct driving engagement. Upon the increase in rotary speed of shaft 6 by virtue of the direct engagement of clutch 7 and bell clutch 39, the sleeve 30 of the secondary gear unit will be carried at a greater speed than the normal rotation of the gear 12 and upon the happening of this event, the rollers 31 of the secondary gear units are returned to their pockets and gear 12 is again permitted to rotate idly.

I have also provided means for manually changing the ratio of the speeds and this is done by manipulation of the shifting lever 25 to carry the gear 15 into engagement with the gear 59 exactly as heretofore described. To change to intermediate speed, a fork 60 which engages the collar 38 may be moved to engage the clutches 36 and 37, thus accomplishing a direct drive for the intermediate speed. Upon movement of the collar 38 to engage clutches 37, 39, and the teeth fixed to gear 7, direct drive between shaft 1 and shaft 6 is accomplished.

In order to produce a reverse movement of the gears, it is only necessary to use the manual shifting lever in the usual way to move gear 15 into engagement with clutch 48 which in turn splines gear 15 to shaft 6 for reverse rotation when gear 15 is in contact with the intermediate stub gear 55 which in turn is driven from the gear cluster through the gear 56. As heretofore mentioned, sleeve clutch 48 is under the influence of the spring 56 and is thus resiliently held in position midway of the normal position of the gear 15 when engaging the gear 59 and the end of the housing 3. This is the convenient position for engaging these two members and furthermore the spring pressure returns the reversing sleeve gear to the position of normal engagement, irrespective of whether or not the same has been moved to the extreme end of the casing.

A particular feature of the invention is the formation of the cam surfaces in the various gear units. By referring to Fig. 3, it will be noted that the cam grooves present a very regular and gradual incline, so that immediately upon operation of the unit, the rollers 17 may move upwardly without delay. It will be noted that this movement is materially assisted and is positively effected when spacing members 22 engage the rollers at their rear and at a point below their axis. Conversely, the rollers are returned to their inoperative position in a positive manner when there is relative rotation between retaining rings 21 and the other gear members. Thus, when for instance, the cammed sleeve rotates at a speed greater than the speed of gear 15, the retaining rings move in a relative counterclockwise direction and spacing members 22 therefore engage rollers 20 at their front, so that they are positively returned to their inoperative position by a force which is directed rearwardly and downwardly.

The relation of the cammed sleeves of the primary speed unit to the cammed sleeves of the secondary and high speed units is of great importance. As hereinbefore stated, the cam grooves of cam sleeve 18 of the primary unit are provided with a very gradual and regular incline so that the rollers 17 commence to move forward as soon as the gear parts are moved with relation to each other so that an immediate clutching action takes place. On the other hand, the cam surface of sleeves 30 and 40 are provided with a groove in the trough thereof as shown at 31' in Fig. 17. The groove 31' serves to retain the rollers of the secondary and high speed units against radial movement until the sleeves have acquired a speed sufficient to cause a sudden clutching action between the rollers and their related gear members. It is obvious that centrifugal force will carry the rollers of the secondary and high speed units outwardly into contact with their related gears and that there will be a relative movement between the cam sleeves and the associated gears to clamp the clutching rollers between the inclined surface of the cam sleeves and the inner surface of the gears. The tension of the springs 35 and 45 are, of course, regulated to determine in a large measure when the clutching rollers may move outwardly. These springs have a critical tension which is overcome by centrifugal force acting upon the clutching rollers, but unless means is provided for restraining the immediate outward movement of the rollers, the critical tension of these springs will be overcome gradually, and it is for the purpose of overcoming this critical tension promptly and quickly that the rollers are retained in the accentuated grooves of these respective cam sleeves. In cases where the rollers are permitted to move into gradual contact with the clutching surfaces, an undesirable relative movement between the clutching parts takes place and this results in heat of friction.

In order to insure the positive disengagement of the clutching rollers in the several gear units and thus prevent heat of friction, I have provided the primary gear unit with spacing members as hereinbefore described. The secondary and high gear units have similarly been provided with spacing members 32 and 44 respectively, but these spacing members are located differently from those in the primary gear unit and this location will now more particularly be described, and herein it may be understood that the spacers of both the secondary speed unit and the high speed unit are similar in construction so that reference to Fig. 4 of the drawings will suffice as a description of both.

Spacing rings 33 and 33' which are in frictional driving contact with gears 7 and 12 and are free to float on cam sleeve 30 and shaft 6 carry the equally spaced transverse roller spacing and actuating member 32 between each two rollers. Spacing members 32 are above the axis of the rollers 31 when the rollers are in disconnected and nondriving position, but the spacers 32 are so positioned that they are below the axis of rotation of the rollers 31 when these rollers are in their clutching or driving position between the gear 12 and the inclined face of the cam sleeve 30. By virtue of this arrangement, it will be noted that the rollers 31 are assisted out of trough 31' into clutching position, while in the reverse movement the spacing members will contact the rollers above their axis of rotation to move the same positively out of contact with the gear 12 by means of a force which is exerted in a rearward and downward direction. When, for example, the shaft 6 is being driven through the primary gear and the sleeves 18 and 30 are locked in driving engagement, the gear 12 will be driven by gear 13 without driving engagement between the gear 12 and the sleeve 30. Under these conditions, the rings 33 and 33' rotate at a speed less than the speed of the sleeve 30 and thereby keep the rollers 31 out of clutching engagement, since the rear edges of the transverse spacing members 32 are pressed into contact with the upper half of the rollers 31.

It will be further noted, that the roller retaining rings as shown in Figs. 12 and 13 and spacing members of gear units 7 and 12 are provided with slots, as more particularly shown at 70 in Fig. 13, and these slots are for the purpose of accommodating springs 35 and 45, which springs likewise rest in groove 34 of the rollers. In this manner, only the largest cylindrical surface of rollers 31 comes into engagement with the inner surface of the gears, and the springs are therefore not brought into contact with the various moving parts with the exception of the rollers.

By the positive clutching roller actuating means which I have just described, I overcome the tendency for the clutching rollers to remain in partial contact with the gears when there is no driving connection between the cam sleeves and the gears and in this manner, I prevent the creation of heat of friction which has heretofore been objectionable.

I have furthermore provided clutch teeth of peculiar configuration on members 48 and 18 and on member 30. Teeth are formed on the peripheral edge of these members and these teeth, as more particularly shown in Figs. 1 and 15, are beveled in a manner corresponding to a reverse bevel on the companion gear. In this manner, I avoid uncertainty in engagement between these teeth, for as the clutch members are brought into engaging position, but in a manner to prevent clean direct engagement, the beveled surface of one tooth will contact the beveled surface of a tooth on another gear and thus the respective teeth will be guided into direct engagement.

What I claim as my invention and that for which I desire to secure by Letters Patent is:

1. In an automatic change speed transmission gearing having a drive shaft and a driven shaft in alignment therewith and having a parallel counter-shaft, a driven sleeve splined to said driven shaft, a primary gear surrounding said driven sleeve, clutch members disposed between said driven sleeve and said primary gear, means associated with said clutch members and in frictional driving contact with said primary gear for moving said members into clutching relation with said sleeve and said gear upon rotation of said gear, a second sleeve carried by said driven shaft, a secondary gear surrounding said sleeve, centrifugally operable members carried by said second sleeve adapted to lock said second sleeve into contact with said secondary gear at a predetermined rotational speed of said second sleeve, means associated with said centrifugally operable members and said secondary gear for positively holding the same completely out of contact with said secondary gear when said centrifugally operable members are not in full driving contact with said secondary gear, means adapted to join said sleeves in driving relation, and gearing interconnecting said drive shaft, counter-shaft, and said gears on said driven shaft.

2. In an automatic change speed transmission gearing having a drive shaft and a driven shaft in alignment therewith and having a parallel counter-shaft, a driven sleeve having cam surfaces thereon splined to said driven shaft, a primary gear surrounding said driven sleeve, clutch members disposed between said driven sleeve and said primary gear, means associated with said clutch members and extending into frictional driving contact with said gear for moving said members into clutching relation with said sleeve and said gear, a second sleeve having cam surfaces on the periphery thereof freely rotatable on said driven shaft, a secondary gear surrounding said sleeve, centrifugally operable members carried by said second sleeve adapted to lock said second sleeve into contact with said secondary gear at a predetermined rotational speed of said second sleeve, means associated with said centrifugally operable members and said secondary gear for positively holding the same out of contact with said secondary gear when said centrifugally operable members contact with said secondary gear, means adapted to join said sleeves in driving relation, and gearing interconnecting said drive shaft, countershaft, and said gears on said driven shaft.

3. In an automatic change speed transmission gearing having a drive shaft and a driven shaft in alignment therewith and having a parallel counter-shaft, a driven sleeve splined to said driven shaft, cam surfaces on the periphery of said sleeve having a regular and gentle inclination, a primary gear surrounding said driven sleeve, clutch members operatively supported by said cam surfaces on said sleeve and disposed between said driven sleeve and said primary gear, means associated with said clutch members and said primary gear for moving said members into clutching relation with said sleeve and said gear upon rotation of said gear, a second sleeve carried by said driven shaft, cam surfaces having an accentuated trough portion on the periphery of said second sleeve, a secondary gear surrounding said sleeve, centrifugally operable means operatively carried by said cam surface on said second sleeve adapted to lock said second sleeve into contact with said secondary gear at a predetermined rotational speed of said second sleeve, means associated with said centrifugally operable members for positively holding the same out of contact with said secondary gear when said centrifugally operable members are not in full driving contact with said secondary gear, means adapted to join said sleeves in driving relation, and gearing interconnecting said drive shaft, counter-shaft, and said gears on said driven shaft.

4. In an automatic change speed transmission gearing having a drive shaft and a driven shaft in alignment therewith and having a parallel counter shaft, a driven sleeve splined to said driven shaft, a primary gear surrounding said driven sleeve, clutch members axially disposed between said driven sleeve and said primary gear, freely revolvable parallel retaining rings in frictional driving contact with said gear on each side of said clutch members interconnected by spaced operating means lying between said members for moving said members into clutching relation with said sleeve and said gear upon rotation of said gear, a second sleeve carried by said driven shaft, a secondary gear surrounding said sleeve, centrifugally operable members carried by said second sleeve adapted to lock said second sleeve into contact with said secondary gear at a predetermined rotational speed of said second sleeve, means associated with said centrifugally operable members for positively holding the same out of contact with said secondary gear when said centrifugally operable members are not in full driving contact with said secondary gear, means adapted to join said sleeves in driving relation and gearing interconnecting said drive shaft, counter-shaft, and said gears on said driven shaft.

5. In an automatic change speed transmission gearing having a drive shaft and a driven shaft in alignment therewith and having a parallel counter-shaft, a driven sleeve splined to said driven shaft, a primary gear surrounding said driven sleeve, clutch members disposed between said driven sleeve and said primary gear, means associated with said clutch members and in frictional driving contact with said primary gear for moving said members into clutching relation with said sleeve and said gear upon rotation of said gear, a second sleeve carried by said driven shaft, a secondary gear surrounding said sleeve, centrifugally operable members carried by said second sleeve adapted to lock said second sleeve into contact with said secondary gear at a predetermined rotational speed of said second sleeve, means comprising freely revolvable parallel retaining ring in frictional driving contact with said secondary gear on each side of said centrifugally operable means interconnected by spaced operating members lying between said centrifugally operable members for positively holding the same out of contact with said secondary gear when said centrifugally operable members are not in full driving contact with said secondary gear, means adapted to join said sleeves in driving relation and gearing interconnecting said drive shaft, counter-shaft, and said gears on said driven shaft.

6. In an automatic change speed transmission gearing having a drive shaft and a driven shaft in alignment therewith and having a parallel counter-shaft, a driven sleeve splined to said driven shaft, transverse cam surfaces on the periphery of said sleeve having a regular and gentle inclination, a primary gear surrounding said driven sleeve, clutch members disposed on said cam surface between said driven sleeve and said primary gear, means comprising a freely revolvable parallel retaining ring in frictional driving contact with said gear on each side of said sleeve interconnected by spaced operating means lying between said clutch members for moving said members into clutching relation with said sleeve and said gear upon rotation of said gear, a second sleeve carried by said driven shaft, cam surfaces having an accentuated trough extending transversely and spaced about the periphery of said sleeve, a secondary gear surrounding said sleeve, centrifugal operable members carried by the cam surfaces of said second sleeve adapted to lock said second sleeve into contact with said secondary gear at a predetermined rotational speed of the said second sleeve, means comprising a freely revolvable parallel retaining ring in frictional driving contact with said secondary gear on each side of said centrifugal operable members interconnected by spaced operating means lying between said centrifugally operable members for positively holding the same out of contact with said secondary gear when said centrifugally operable members are not in full driving contact with said secondary gear, means adapted to join said sleeves in driving relation and gearing interconnecting said drive shaft, counter-shaft, and said gears on said driven shaft.

JOHN W. CONNORS.